(12) United States Patent
Fleishman et al.

(10) Patent No.: US 8,578,804 B2
(45) Date of Patent: Nov. 12, 2013

(54) SYNCHRONIZED GEAR SHIFT SYSTEM

(75) Inventors: Steven M. Fleishman, Lynden, WA (US); Duane Golden, Hastings, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 682 days.

(21) Appl. No.: 12/447,965

(22) PCT Filed: Oct. 24, 2007

(86) PCT No.: PCT/US2007/022530
§ 371 (c)(1),
(2), (4) Date: Apr. 29, 2010

(87) PCT Pub. No.: WO2008/054662
PCT Pub. Date: May 8, 2008

(65) Prior Publication Data
US 2010/0199793 A1  Aug. 12, 2010

Related U.S. Application Data

(60) Provisional application No. 60/855,566, filed on Oct. 31, 2006.

(51) Int. Cl.
*F16H 3/38* (2006.01)
*F16H 59/00* (2006.01)
*F16H 61/00* (2006.01)
*F16H 63/00* (2006.01)

(52) U.S. Cl.
USPC ........................................... 74/339; 74/337.5

(58) Field of Classification Search
USPC ................. 74/339, 340, 342, 343; 192/48.91, 192/48.92, 38, 45.004, 47
See application file for complete search history.

(56) References Cited

U.S. PATENT DOCUMENTS

| | | | |
|---|---|---|---|
| 2,348,980 A | | 5/1944 | Johnson |
| 3,931,872 A | * | 1/1976 | Dissett ............................ 192/43 |
| 4,987,790 A | | 1/1991 | Weismann |
| 5,131,285 A | | 7/1992 | Weismann et al. |
| 5,178,250 A | * | 1/1993 | Ashikawa et al. ............... 192/38 |

(Continued)

FOREIGN PATENT DOCUMENTS

| | | | | | |
|---|---|---|---|---|---|
| JP | | 55078844 A | * | 6/1980 | ................ F16H 5/08 |
| JP | | 2005016595 A | * | 1/2005 | .............. F16D 23/06 |

(Continued)

*Primary Examiner* — David M Fenstermacher
*Assistant Examiner* — Jake Cook
(74) *Attorney, Agent, or Firm* — Dickinson Wright PLLC

(57) ABSTRACT

A mechanism with an inner race, which has cams, an outer race and rollers between the cams and the outer race. The inner race has a first notch while the outer race has a second notch with a narrow portion and a wider portion. A member is disposed in the first and second notches. Positioning of the member in the first notch and the narrow portion of the second notch inhibits relative rotation between the inner and outer races and power is not transmitted between the outer race and a power transmitting member, such as a gear. Positioning of the member in the first notch and the wider portion of the second notch permits some relative rotation between the inner and outer races to cause the cams to urge the rollers outwardly so that the outer race frictionally engages the power transmitting member to facilitate transmission of rotary power therebetween.

18 Claims, 12 Drawing Sheets

(56) References Cited

U.S. PATENT DOCUMENTS

| | | | |
|---|---|---|---|
| 6,364,083 B1* | 4/2002 | Gluys et al. | 192/53.31 |
| 6,557,680 B2* | 5/2003 | Williams | 192/27 |
| 6,652,407 B2* | 11/2003 | Ronk et al. | 475/204 |
| 6,974,400 B2 | 12/2005 | Williams | |
| 6,997,296 B2* | 2/2006 | Hu et al. | 192/44 |
| 7,004,874 B2* | 2/2006 | Mizon et al. | 475/198 |
| 7,083,538 B2* | 8/2006 | Szalony et al. | 475/149 |
| 2002/0084164 A1* | 7/2002 | Burger | 192/48.91 |
| 2005/0215376 A1* | 9/2005 | Williams et al. | 475/198 |
| 2006/0142109 A1 | 6/2006 | Williams et al. | |
| 2006/0191763 A1 | 8/2006 | Joki | |
| 2010/0024582 A1* | 2/2010 | Fitzgerald | 74/339 |
| 2010/0078283 A1* | 4/2010 | Ledetzky et al. | 192/53.362 |

FOREIGN PATENT DOCUMENTS

| | | | |
|---|---|---|---|
| WO | WO2005/068867 | 7/2005 | |
| WO | WO2006/029143 | 3/2006 | |
| WO | WO2006/052678 | 5/2006 | |
| WO | WO2007/033041 | 3/2007 | |
| WO | WO 2010005795 A1 * | 1/2010 | F16D 43/284 |

* cited by examiner

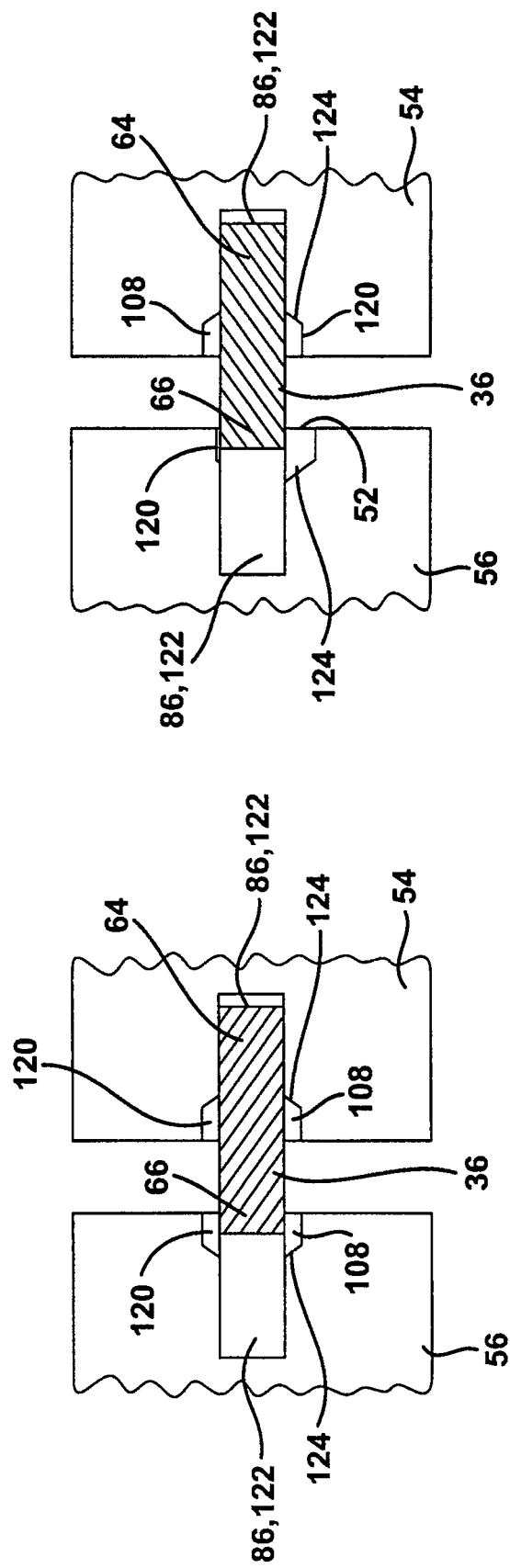

SYNCHRONIZED GEAR SHIFT SYSTEM

INTRODUCTION

The present invention generally relates to power transmitting devices, such as automotive transmissions, and a means for controlling the selective coupling of power transmitting members in a power transmitting device.

A wide variety of devices have long been available for mechanical engagement of rotating components. Where such engagement is to occur with the elements rotating, a variety of coupling mechanisms are frequently employed. For example, clutches, fluid couplings, friction bands and synchronizing rings are commonly employed in automotive transmissions. In many circumstances, these devices are quite adequate. However, some of these devices are subject to power loss, rapid wear, lack of sufficient engaging strength and/or lack of sufficient engaging speed.

Mechanisms for automatically locking components have been employed which provide rapid engagement, very substantial engaging strength, and extended wear. One such device is a roller clutch which employs an engagement inner having an inner race, an engagement outer having an outer race and rollers therebetween. One of the two races has cam surfaces which are inclined relative to the other race. The rollers are set within a cage which generally rotates with the cam surfaces. A slight rotation of the cage relative to the cam surfaces results in selected engagement or disengagement of the inner and outer elements through wedging or releasing of the rollers. Such a roller clutch is disclosed in U.S. Pat. No. 3,283,611 to Weismann et al., entitled Positive Drive Differential and U.S. Pat. No. 4,987,790 to Weismann entitled "Transmission", the disclosures of which are hereby incorporated by reference as if fully set forth in detail herein.

In the '611 patent to Weismann et al., automatic disengagement of the mechanism occurs when differential speeds are experienced by the mechanism. However, it was noted in the '790 patent to Weismann that employment of such a roller cam engagement mechanism with selective engagement and disengagement in transmission applications has eluded practical utility as the components exhibit substantially inelastic impact when coupling and, under certain circumstances, can experience repeated bouncing out of wedging engagement. It was further noted in the '790 patent to Weismann that the engagement can be so rapid that damage might be done to other components in the rotating power train and that proper control of the cage such that it will remain properly oriented relative to the cam surfaces and yet remain selectively controllable for engagement and disengagement had also proven difficult. While the engagement mechanism of the '790 patent to Weismann sought to overcome these issues, there nonetheless remains room for improvement.

SUMMARY

In one form, the present teachings provide a power transmitting device having a shaft, a power transmitting member, an inner race, an outer race, a plurality of wedging members and an actuator. The power transmitting member has a bore with a bore surface that is disposed about the shaft. The inner race is coupled for rotation with the shaft and includes a plurality of cam surfaces. The inner race defines a first actuator notch. The outer race is disposed about the inner race and is received in the bore. The outer race is a circumferentially extending band having a pair of end segments that are spaced apart from one another to define a slit therebetween. The outer race has a race surface and defines a second actuator notch. The second actuator notch includes a first portion, a transition portion and a second portion. The first portion is defined by a first width and the second slotted portion is defined by a second width that is smaller than the first width. The transition portion couples the first and second slotted portions. The wedging elements are disposed between the inner race and the outer race and each wedging element is disposed between an associated one of the cam surfaces and the race surface. The actuator has a hub and an actuator member. The hub is mounted on the shaft and aligns the actuator member to the first and second actuator notches. The actuator member is selectively positionable in a first position and a second position. Positioning of the actuator member in the first position places the actuator member in the first actuator notch and the second portion of the second actuator notch to permit the wedging elements to be maintained in a radially inward position that disengages the outer race from the bore surface of the power transmitting member to thereby rotationally disengage the power transmitting member from the shaft. Positioning of the actuator member in the second position places the actuator member in the first actuator notch and the first portion of the second actuator notch to permit the wedging elements to be maintained in a radially outward position that engages the outer race to the bore surface of the power transmitting member to thereby rotationally engage the power transmitting member with the shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 15 is a view similar to that of FIG. 12 but illustrating the engagement mechanism in a third position; and FIG. 16 is similar to FIG. 15, but illustrates relative rotation between the second inner race and the second outer race.

DETAILED DESCRIPTION OF THE VARIOUS EMBODIMENTS

Figure 1:
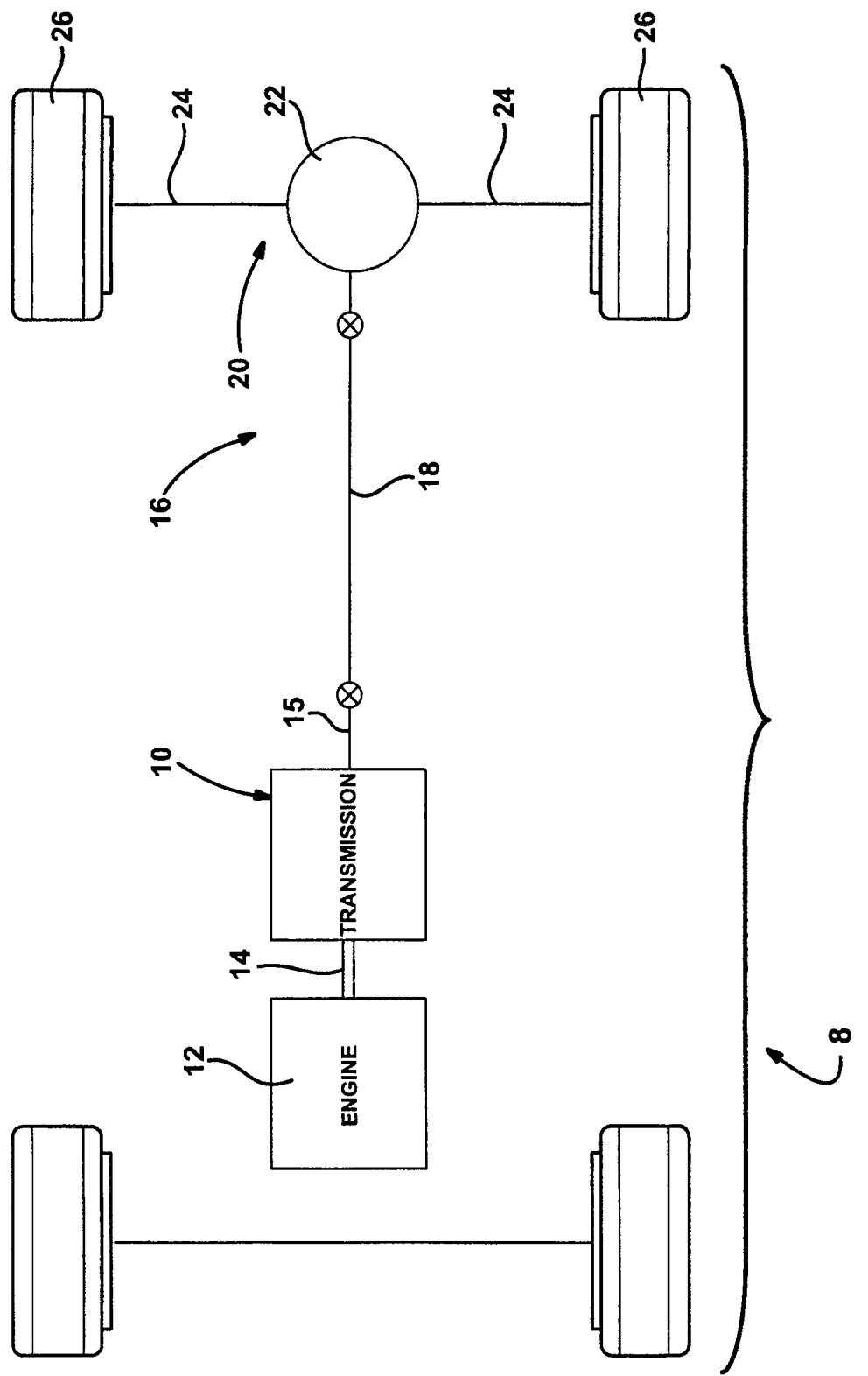
FIG. 1 is a schematic illustration of a vehicle having a power transmitting device constructed in accordance with the teachings of the present disclosure.

With reference to FIG. 1 of the drawings, a vehicle 8 having a power transmitting device 10 constructed in accordance with the teachings of the present invention is schematically illustrated. In the particular example provided, the power transmitting device is a manual transmission, but those of ordinary skill in the art will appreciate that the teachings of the present disclosure have applicability to other types of power transmitting devices, including transfer cases. The vehicle 8 can include a power source, such as an internal combustion engine 12 that supplies rotary power to the transmission 10 via an input shaft 14. An output shaft 15 of the transmission 10 can be coupled to a vehicle driveline 16 in a conventional manner. In the example provided, the vehicle driveline 16 includes a propeller shaft 18 and an axle assembly 20 that includes a differential 22 and a pair of axle shafts 24 that are coupled to the driven wheels 26 of the vehicle 8. Rotary power output through the output shaft 15 is transmitted to the differential 22 via the propeller shaft 18. The differential 22 controls the distribution of drive torque to the driven wheels 26, which are coupled to the differential 22 by the axle shafts 24.

Figure 2:
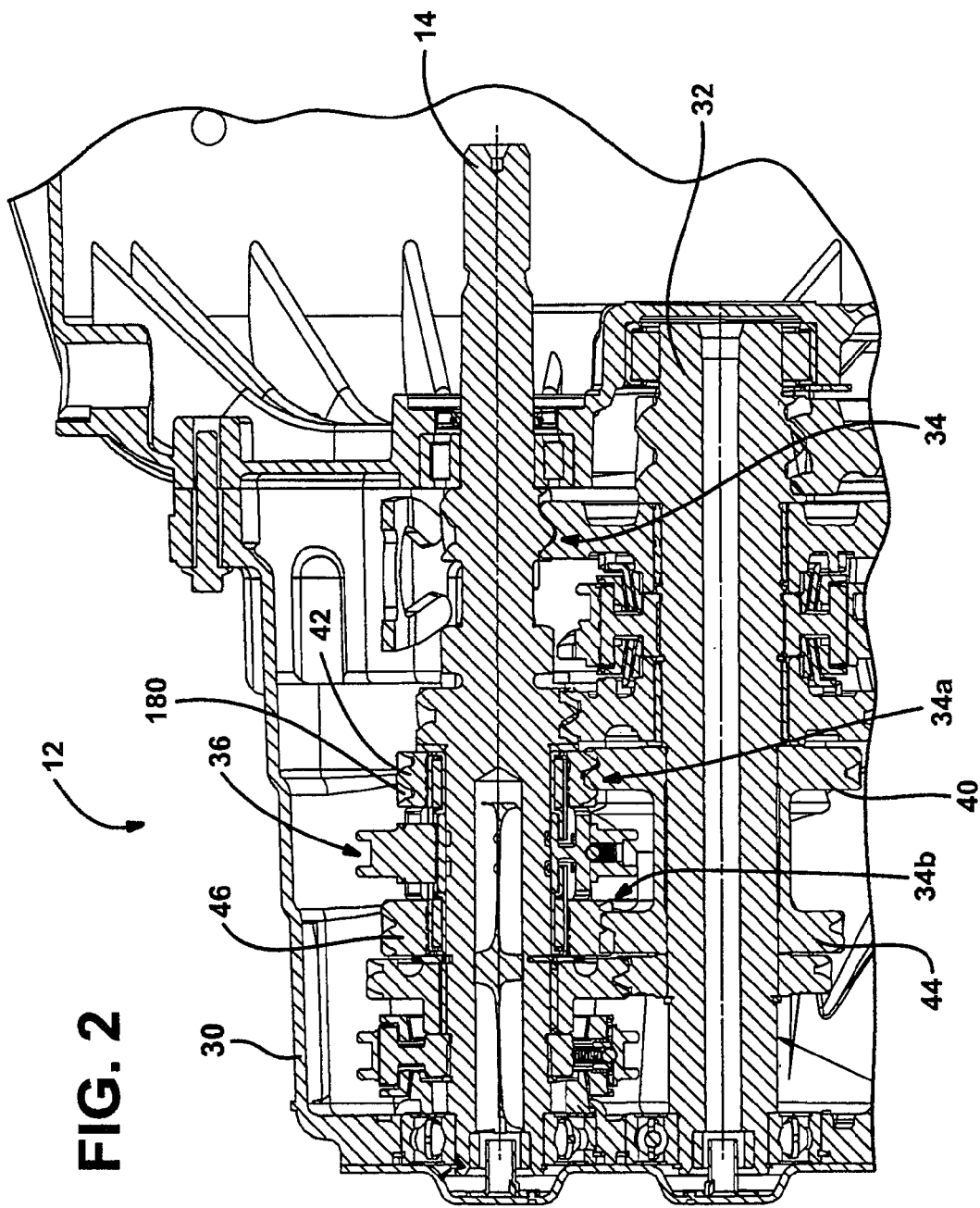
FIG. 2 is a sectional view of a portion of the power transmitting device of FIG. 1.
Figure 3:
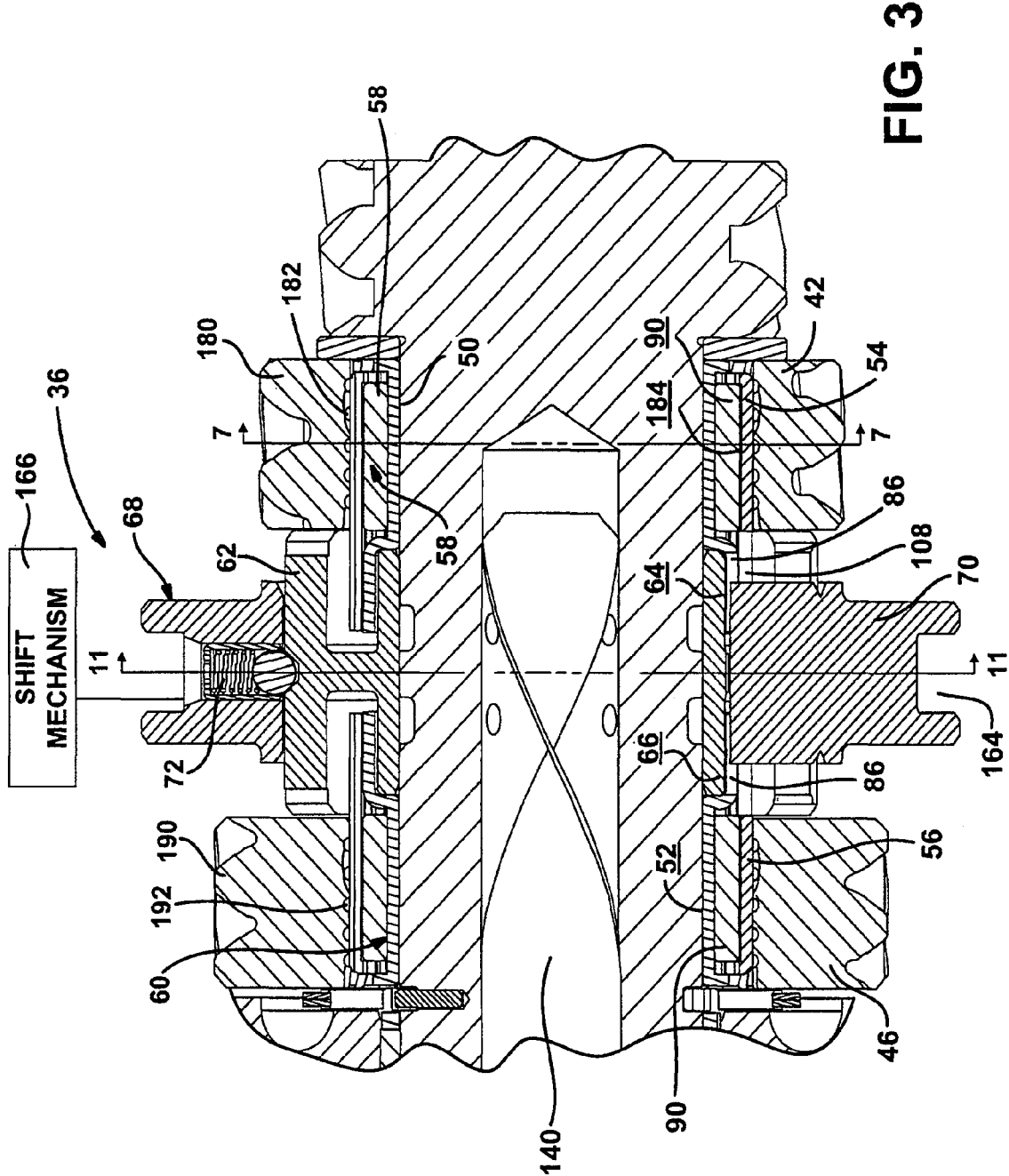
FIG. 3 is an enlarged view of a portion of FIG. 2.
Figure 4:
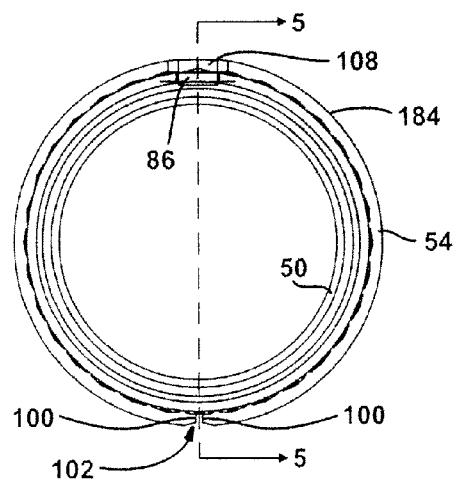
FIG. 4 is a front elevation view of a portion of the power transmitting device of FIG. 1 illustrating the first inner race, the second inner race and the first set of wedging members.
Figure 5:
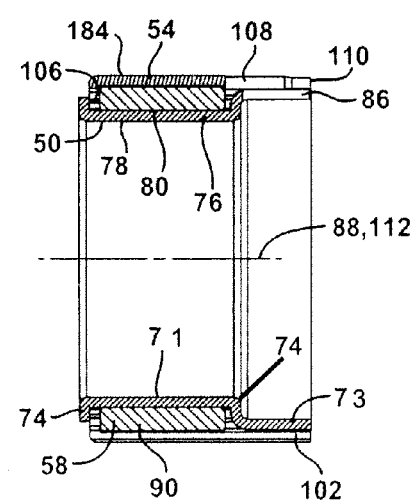
FIG. 5 is a sectional view taken along the line 5-5 of FIG. 4.
Figure 6:
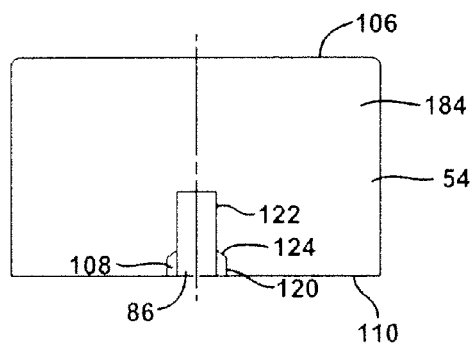
FIG. 6 is a top plan view of the first inner race, the second inner race and the first set of wedging members.

With reference to FIGS. 2 and 3, the transmission 12 is illustrated to include a housing 30 that journally supports the input shaft 14, a counter shaft 32 and the output shaft (not specifically shown). A plurality of gear pairs 34 are associated with the input shaft 14 and the counter shaft 32 and are selectively employed to reduce the speed and increase the torque of the rotary power that is input to the input shaft 14 of the transmission 12. Generally, a first one of gears of each gear pair 34 is coupled for rotation with one of the input shaft 14 and the counter shaft 32, while the second one of the gears of the gear pair 34 is rotatably mounted on the other one of the input shaft 14 and the counter shaft 32. An engagement mechanism 36, which is disposed on the other one of the input shaft 14 and the counter shaft 32, can be employed to selectively lock the second one of the gears of the gear pair 34 to the other one of the input shaft 14 and the counter shaft 32.

For purposes of discussion, a first gear pair 34a can include a first fixed gear 40, which can be coupled for rotation with the counter shaft 32, and a first selective gear 42, which can be mounted for rotation on the input shaft 14, and a second gear pair 34b can include a second fixed gear 44, which can be coupled for rotation with the counter shaft 32, and a second selective gear 46 that can be mounted for rotation on the input shaft 14. It will be appreciated, however, that the first and second fixed gears 40 and 44 could be associated with the counter shaft 32 and the first and second selective gears 42 and 46 could be associated with the input shaft 14.

With specific reference to FIG. 3, the engagement mechanism 36 can include first and second inner races 50 and 52, first and second outer races 54 and 56, first and second sets of wedging elements 58 and 60, a hub 62, first and second actuator members 64 and 66 and a detent mechanism 68 that can include a detent hub 70 and a plurality of detent devices 72.

With reference to FIGS. 4 through 7, the first inner race 50, the first outer race 54 and the first set of wedging elements 58 are illustrated. It will be appreciated that the second inner race 52 (FIG. 3), the second outer race 56 (FIG. 3) and the second set of wedging elements 60 (FIG. 3) can be generally identical to the first inner race 50, the first outer race 54 and the first set of wedging elements 58, respectively, and as such a specific discussion of the second inner race 52 (FIG. 3), the second outer race 56 (FIG. 3) and the second set of wedging elements 60 (FIG. 3) is not needed.

The first inner race 50 can be a band of hardened steel that can define a channel structure 71 and a first circumferentially extending lip member 73. The channel structure 71 can define opposite channel walls 74 and a circumferentially extending channel 76. The channel 76 can have an inner surface 78, which can be fixedly secured to the input shaft 14, for example via an interference fit, and an outer surface 80 that can define a plurality of cam surfaces 82. Each cam surface 82 can be defined by a radius and the first inner race 50 can be thinnest at a circumferential mid-point of the cam surface 82 and thickest at the circumferential ends of the cam surface 82 where the cam surface 82 intersects the adjacent cam surfaces 82. The first circumferentially extending lip member 73 can be coupled to one of the channel walls 74 and can extend laterally outwardly therefrom. A first actuator notch 86 can be formed through a portion of the first circumferentially extending lip member 73 in a direction that is generally parallel to a centerline 88 of the first inner race 50. The first actuator notch 86 can have a predetermined first width (w1).

The first set of wedging elements 58 can include a plurality of rollers 90 that can be received in the channel 76. Each of the rollers 90 can be disposed against an associated one of cam surfaces 82. A cage 92 can be employed to maintain the rollers 90 at a predetermined circumferential spacing.

The first outer race 54 can be a split band of hardened, resilient steel having end surfaces 100 that are circumferentially spaced apart from one another to define a slot 102 therebetween. An inside surface 104 of the first outer race 54 can be disposed in contact with the rollers 90. A first lateral end 106 of the first outer race 54 can extend radially inwardly and can be disposed between the rollers 90 and the channel wall 74 opposite the first actuator notch 86. A second actuator notch 108 can be formed in a second lateral end 110 of the first outer race 54 opposite the first lateral end 106. The second actuator notch 108 can extend generally parallel to the centerline 112 of the first outer race 54 and can be located radially opposite from the slot 102. The second actuator notch 108 can include a first portion 120, a second portion 122 and a transition portion 124 that interconnects the first and second portions 120 and 122. The first portion 120 can have a predetermined second width (w2) that can be wider than the predetermined first width (w1) of the first actuator notch 86. The second portion 122 can have a predetermined third width (w3) that can be about equal to the predetermined first width (w1) of the first actuator notch 86. The transition portion 124 can be shaped in a desired manner, such as tapering (as shown) or arcuate, between the first and second portions 120 and 122.

With reference to FIGS. 3 and 8 through 11, the hub 62 can include an inner sleeve portion 130, an outer sleeve portion 132 and a web member 134 that can interconnect the inner and outer sleeve portions 130 and 132. A plurality of lubrication apertures 138 can be formed radially through the inner and outer sleeve portions 130 and 132. The inner sleeve portion 130 can be coupled for rotation with the input shaft 14 and lubricating oil (not shown) may be fed under pressure through a lubrication gallery 140 (FIG. 3) in the input shaft 14 to through the lubrication apertures 138 to thereby lubricate portions of the engagement mechanism 36. A detent groove 142 can extend about the circumference of the outer sleeve portion 132. The web member 134 can space the outer sleeve portion 132 radially outwardly of the inner sleeve portion 130 to define annular cavities 146 into which the first circumferentially extending lip member 73 (FIG. 5) of the first inner race 50 and the second lateral end 110 (FIG. 5) of the first outer race 54 can be received. In this regard, the inner sleeve portion 130 can extend radially outwardly from the input shaft 14 to support the first circumferentially extending lip member 73 (FIG. 5) of the first inner race 50 and the second lateral end 110 (FIG. 5) of the first outer race 54. An actuator slot 150 can be formed radially through the outer sleeve portion 132 and the web member 134. The actuator slot 150 can extend generally parallel to a centerline 152 of the hub 62.

Figure 11:
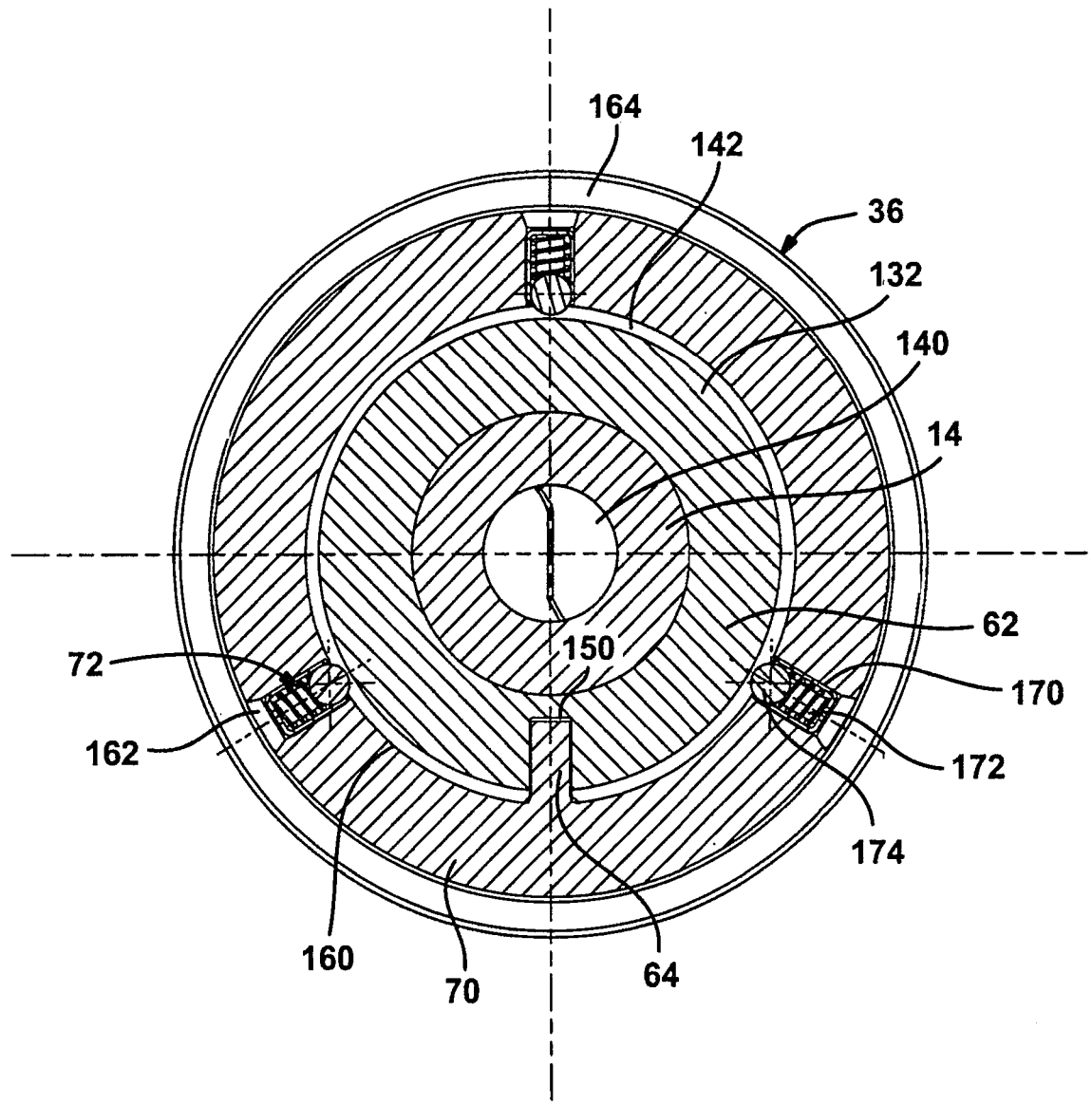
FIG. 11 is a sectional view taken along the line 11-11 of FIG. 3.
Figure 12:
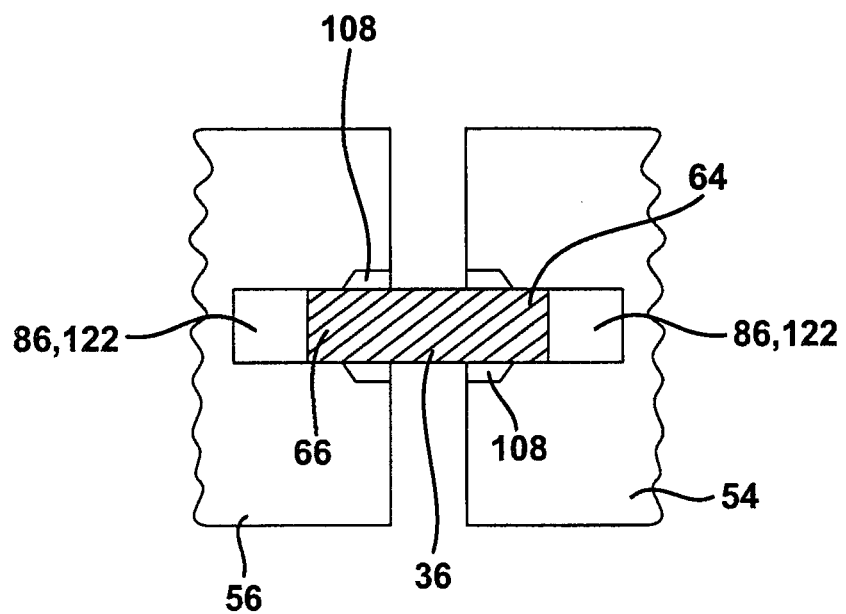
FIG. 12 is a plan view in partial section of a portion of the power transmitting device of FIG. 1 with the engagement mechanism in a first or neutral position.

With reference to FIGS. 3 and 11, the first and second actuator members 64 and 66 are integrally formed with the detent hub 70 in the particular example provided, but those of ordinary skill in the art will appreciate that the first and second actuator members 64 and 66 could be one or more elements that are fixed to the detent hub 70. The detent hub 70 can be a hollow structure that can define an inner hub surface 160, a plurality of circumferentially spaced apart detent apertures 162 and a circumferentially extending fork groove 164 that is configured to be engaged by shift mechanism 166, which is schematically illustrated. Shift mechanisms are well known in the art and as such, a detailed discussion of the shift mechanism 166 need not be provided herein. The inner hub surface 160 is mounted on the outer sleeve portion 132 of the hub 62 and can translate axially along the hub 62 in two directions. The detent apertures 162 can include holes into which the detent devices 72 are received. In the particular example provided, each detent device 72 includes a detent housing 170, a spring 172 and a detent plunger 174 that is biased outwardly from the detent housing 170 by the spring 172. The detent housing 170 can be coupled to the detent hub 70 via an adhesive and/or an interference fit. The detent plunger 174 is configured to extend through the inner hub surface 160 and engage the outer sleeve portion 132 to resist unintended axial movement of the detent hub 70 relative to the hub 62.

As noted above, the first and second actuator members 64 and 66 can be integrally formed with the detent hub 70. In the particular example provided, the first and second actuator members 64 and 66 are integrated into a single generally rectangular prism that can extend radially inwardly from the detent hub 70. The first and second actuator members 64 and 66 have a width that is about equal to the first predetermined width (w1) of the first actuator notch 86 in the first and second inner races 50 and 52. Accordingly, it will be appreciated that each of the first and second actuator members 64 and 66 can be slidingly received into the first actuator notch 86 and the second portion 122 (FIG. 6) of the second actuator notch 108. The first actuator member 64 can extend through the web member 134 (FIG. 9) of the hub 62 and can be received into the first actuator notch 86 in the first inner race 50 and the second actuator notch 108 in the first outer race 54. Similarly, the second actuator member 66 can extend through the web member 134 (FIG. 9) of the hub 62 and can be received into the first actuator notch 86 in the second inner race 52 and the second actuator notch 108 in the second outer race 56.

With renewed reference to FIG. 3, the first selective gear 42 can include a plurality of gear teeth 180 and bore 182 that is sized to receive the first outer race 54 therein. The bore 182 can have a surface that can be textured (e.g., grooved) to facilitate the formation of a film of lubrication between the surface of the bore 182 and an outer surface 184 of the first outer race 54, as well as frictional engagement between outer surface 184 of the first outer race 54 and the surface of the bore 182 when the first selective gear 42 is activated by the engagement mechanism 36 to thereby lock the first selective gear 42 to the input shaft 14 for rotation therewith. Similarly, the second selective gear 46 can include a plurality of gear teeth 190 and a bore 192 that is sized to receive the second outer race 56 therein. The bore 192 can have a surface that can be textured (e.g., grooved) to facilitate the formation of a film of lubrication between the surface of the bore 192 and the outer surface of the second outer race 56, as well as frictional engagement between the surface of the bore 192 and the second outer race 56 when the second selective gear 46 is activated by the engagement mechanism 36 to thereby lock the second selective gear 46 to the input shaft 14 for rotation therewith.

With reference to FIGS. 3 and 12 through 16, the engagement mechanism 36 can be operated in a first mode, a second mode and a third mode. With specific reference to FIGS. 3 and 12, the engagement mechanism 36 is illustrated in the first or neutral mode wherein the first actuator member 64 is disposed in the first actuator notch 86 in the first inner race 50 and the second portion 122 of the second actuator notch 108 in the first outer race 54 and the second actuator member 66 is disposed in the first actuator notch 86 in the second inner race 52 and the second portion 122 of the second actuator notch 108 in the second outer race 56. In this condition, the first inner race 50 is rotationally locked to the first outer race 54 (via the first actuator member 64) and the first set of wedging elements 58 can be disposed at or proximate the circumferential mid-point of an associated cam surface 82 (FIG. 7) to thereby disengage the first outer race 54 from the surface of the bore 182, which can decouple the first selective gear 42 from the input shaft 14 to permit relative rotation between the input shaft 14 and the first selective gear 42. Similarly, the second inner race 52 is rotationally locked to the second outer race 56 (via the second actuator member 66) and the second set of wedging elements 60 can be disposed at or proximate the circumferential mid-point of an associated cam surface 82 to thereby disengage the second outer race 56 from the surface of the bore 192, which can decouple the second selective gear 46 from the input shaft 14 to permit relative rotation between the input shaft 14 and the second selective gear 46. With brief reference to FIG. 11, the plungers 174 of the detent devices 72 can be engaged to the detent groove 142 in the hub 62 to resist axial movement of the detent hub 70 and the actuator members (e.g., the first actuator member 64) to maintain the engagement mechanism 36 in the first mode.

Figure 13:
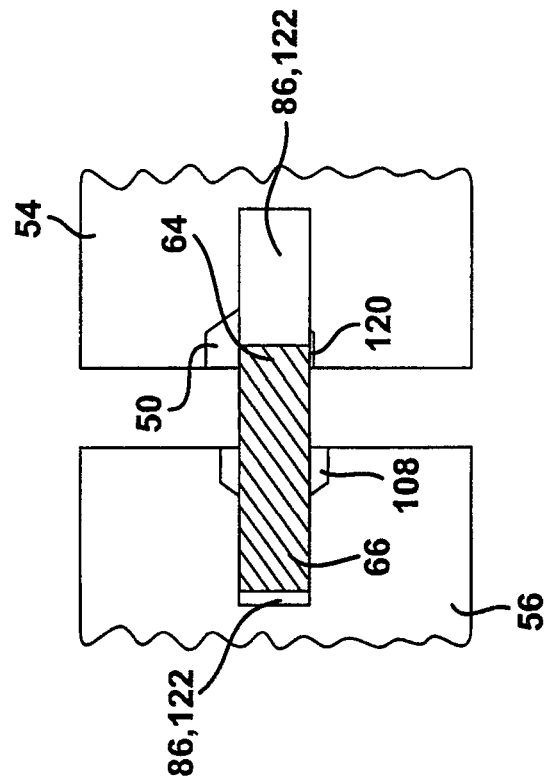
FIG. 13 is a view similar to that of FIG. 12 but illustrating the engagement mechanism in a second position.
Figure 14:
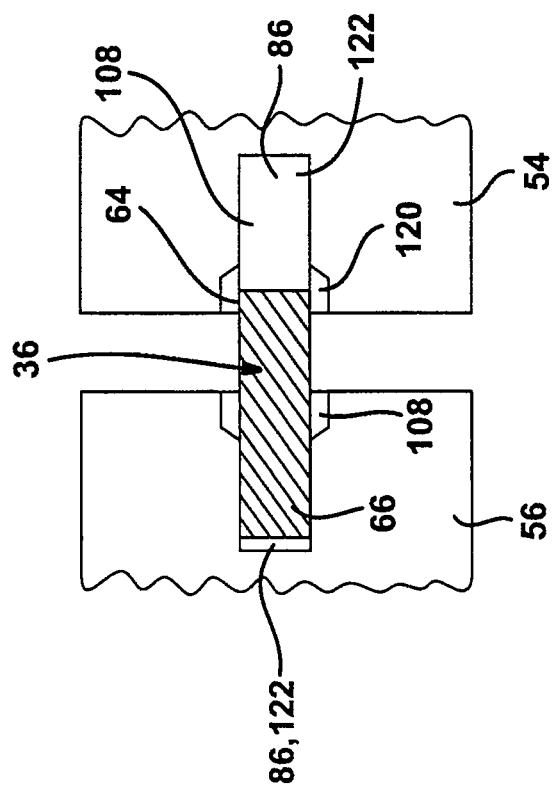
FIG. 14 is similar to FIG. 13, but illustrates relative rotation between the first inner race and the first outer race.

With specific reference to FIGS. 3 and 13, the engagement mechanism 36 is illustrated in the second mode wherein the detent hub 70 is translated toward the second selective gear 46. In this position, the first actuator member 64 is disposed in the first actuator notch 86 in the first inner race 50 and the first portion 120 of the second actuator notch 108 in the first outer race 54 and the second actuator member 66 is disposed in the first actuator notch 86 in the second inner race 52 and the second portion 122 of the second actuator notch 108 in the second outer race 56. As the width of the first actuator member 64 is smaller that the width of the first portion 120 of the second actuator notch 108, a limited amount of relative rotation is permitted between the first inner race 50 and the first outer race 54. However, the second inner race 52 and the second outer race 56 are rotatably locked (via the second actuator member 66) as described above. Relative rotation between the first inner race 50 and the first outer race 54, which is illustrated in FIG. 14, causes the first set of wedging elements 58 to rotate relative to the cam surfaces 82 (FIG. 7) such that the rollers 90 are moved from a point at or proximate the mid-point of the cam surfaces 82 (FIG. 7) to a point proximate one of the ends of the cam surfaces 82. As the cam surfaces 82 (FIG. 7) are thicker at their ends, it will be appreciated that the rollers 90 of the first set of wedging elements 58 move radially outwardly, thereby engaging the first outer race 54 against the surface of the bore 182 to rotationally lock the first selective gear 42 to the first outer race 54. Consequently, rotary power can be transmitted between the input shaft 14 and the first selective gear 42.

Figure 7:
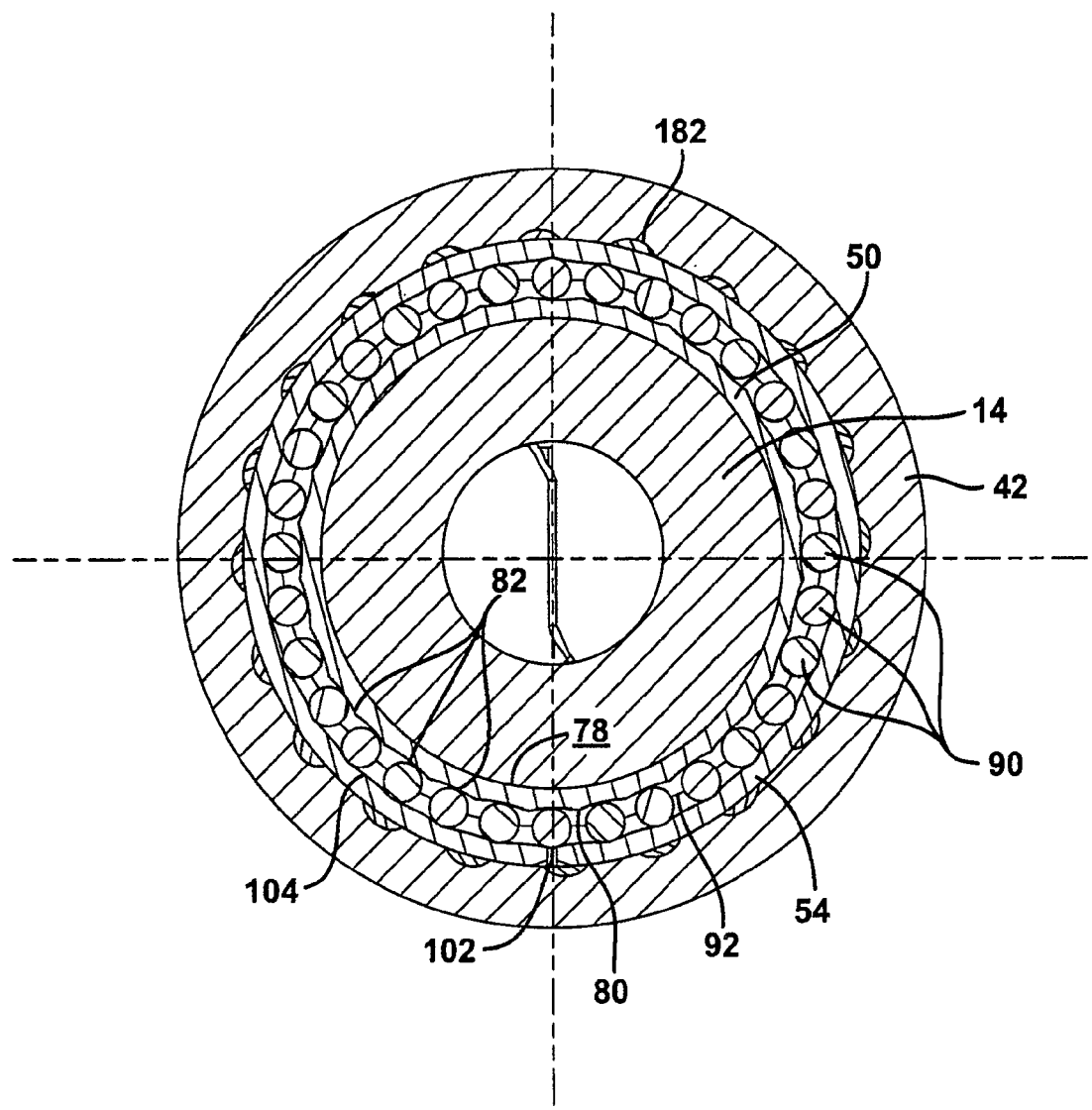
FIG. 7 is a sectional view taken along the line 7-7 of FIG. 3.
Figure 8:
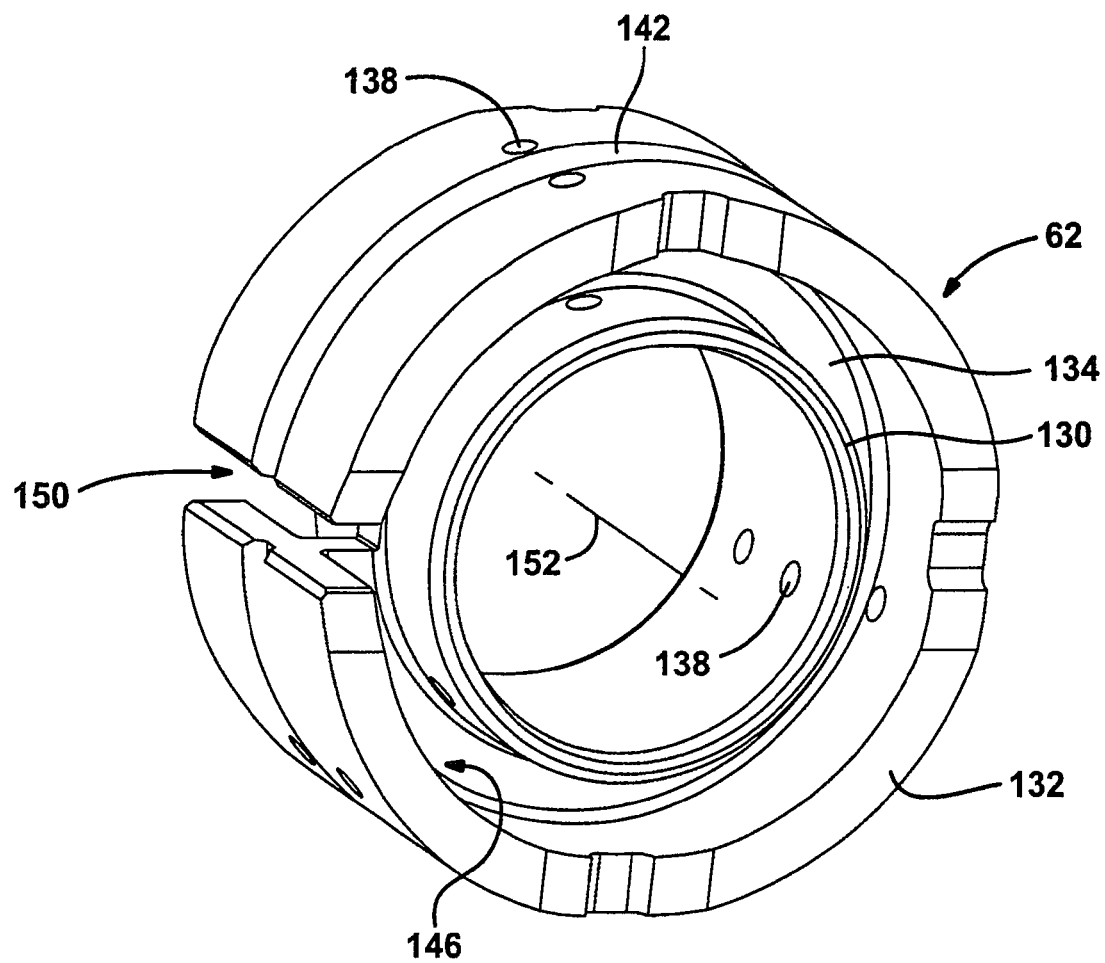
FIG. 8 is a perspective view of a portion of the power transmitting device of FIG. 1 illustrating the hub in greater detail.
Figure 9:
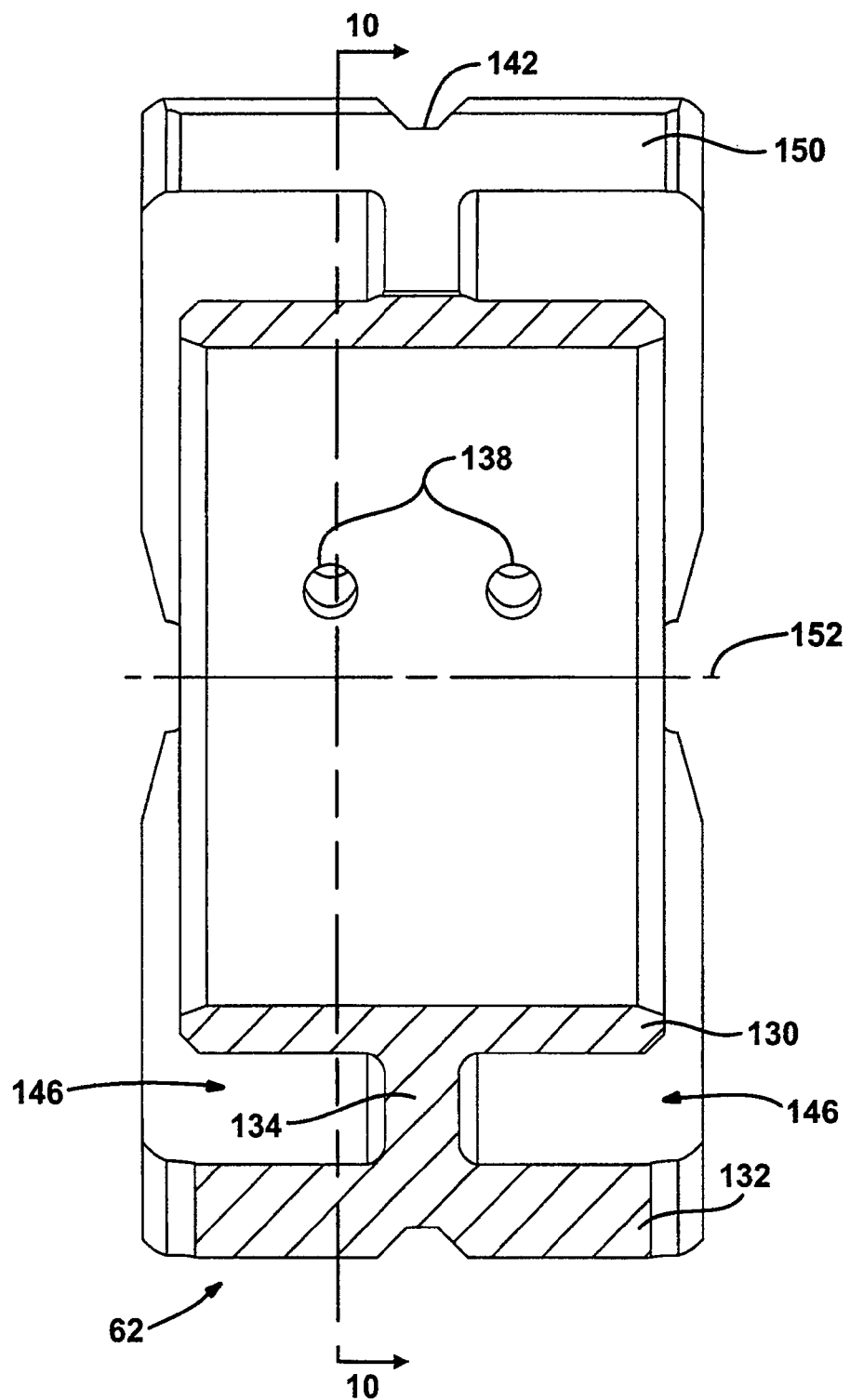
FIG. 9 is a sectional view of the hub.
Figure 10:
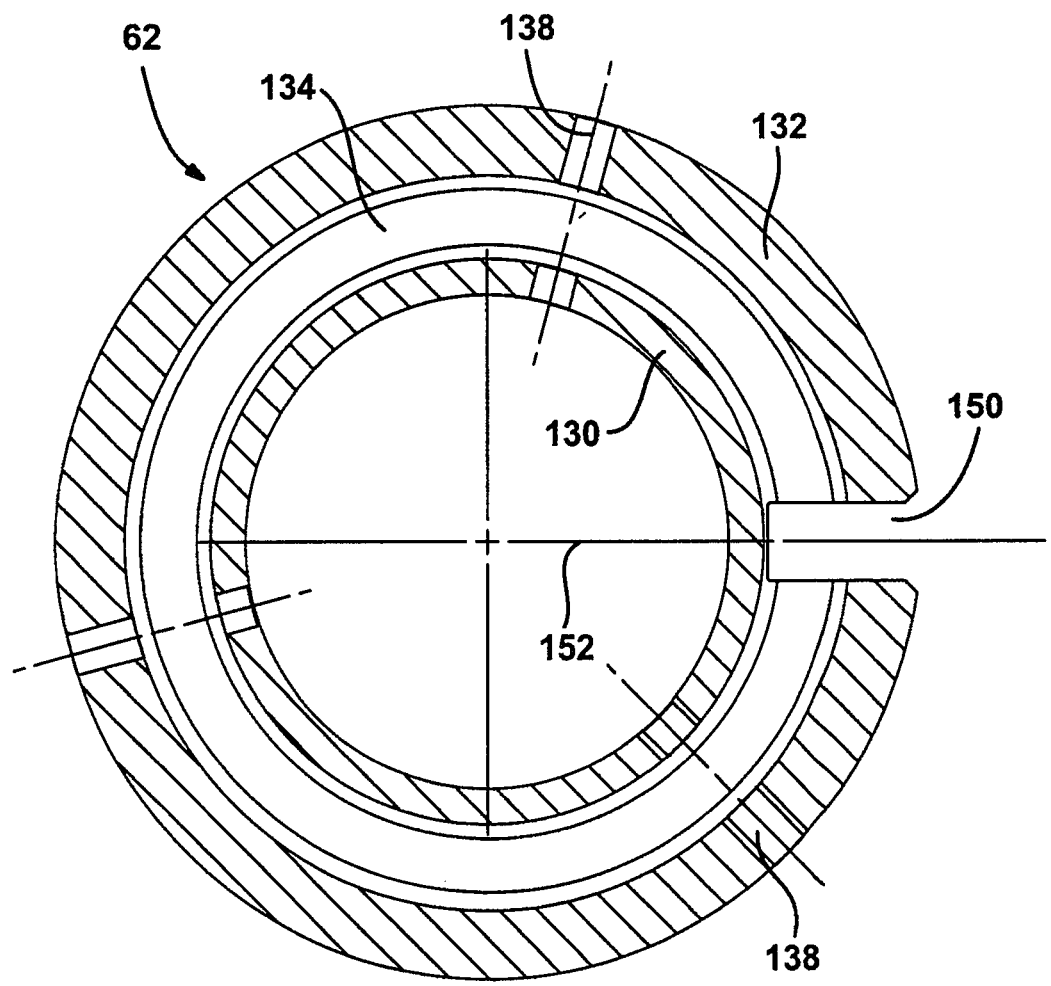
FIG. 10 is a sectional view taken along the line 10-10 of FIG. 9.

With specific reference to FIGS. 3 and 15, the engagement mechanism 36 is illustrated in the third mode wherein the detent hub 70 is translated toward the first selective gear 42. In this position, the first actuator member 64 is disposed in the first actuator notch 86 in the first inner race 50 and the second portion 122 of the second actuator notch 108 in the first outer race 54 and the second actuator member 66 is disposed in the first actuator notch 86 in the second inner race 52 and the first portion 120 of the second actuator notch 108 in the second outer race 56 and. As the width of the second actuator member 66 is smaller that the width of the first portion 120 of the second actuator notch 108, a limited amount of relative rotation is permitted between the second inner race 52 and the second outer race 56. However, the first inner race 50 and the first outer race 54 are rotatably locked (via the first actuator member 64) as described above. Relative rotation between the second inner race 52 and the second outer race 56, which is illustrated in FIG. 16, causes the second set of wedging elements 60 to rotate relative to the cam surfaces 82 (FIG. 7) such that the rollers 90 are moved from a point at or proximate the mid-point of the cam surfaces 82 (FIG. 7) to a point proximate one of the ends of the cam surfaces 82 (FIG. 7). As the cam surfaces 82 (FIG. 7) are thicker at their ends, it will be appreciated that the rollers 90 of the second set of wedging elements 60 move radially outwardly, thereby engaging the second outer race 56 against the surface of the bore 192 to rotationally lock the second selective gear 46 to the second outer race 56. Consequently, rotary power can be transmitted between the input shaft 14 and the second selective gear 46.

It will be appreciated that the transition portion 124 of the second actuator notch 108 can be shaped to aid in the positioning of an associated one of the first and second actuator members 64 and 66 from the first portion 120 to the second portion 122.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A power transmitting device comprising:
    a shaft;
    a power transmitting member having a bore, the bore having a bore surface that is disposed about the shaft;
    an inner race coupled for rotation with the shaft, the inner race having a plurality of cam surfaces, the inner race defining a first actuator notch formed through a first circumferentially extending lip member;
    an outer race disposed about the inner race and received in the bore, the outer race being a circumferentially extending band having a pair of end segments that are spaced apart from one another to define a slit therebetween, the outer race having a race surface and defining a second actuator notch formed through a second circumferentially extending lip member, the second actuator notch aligned with respect to the first actuator notch and including a first portion, a transition portion and a second portion, the first portion being defined by a first width, the second portion being defined by a second width that is smaller than the first width, the transition portion coupling the first and second portions;
    a plurality of wedging elements between the inner race and the outer race, each wedging element being disposed between an associated one of the cam surfaces and the race surface; and
    an actuator having a hub and an actuator member, the hub being fixedly mounted on the shaft adjacent to the power transmitting member and defining an annular cavity and an actuator slot, the first and second circumferentially extending lip members being disposed within the annular cavity and the actuator member being disposed within the actuator slot for aligning the actuator member for movement relative to the first and second actuator notches, the actuator member being selectively positionable in a first position and a second position relative to the hub, wherein positioning of the actuator member in the first position places the actuator member in the first actuator notch and the second portion of the second actuator notch to permit the wedging elements to be maintained in a radially inward position that disengages the outer race from the bore surface of the power transmitting member to thereby rotationally disengage the power transmitting member from the shaft, wherein positioning of the actuator member in the second position places the actuator member in the first actuator notch and the first portion of the second actuator notch to permit the wedging elements to be maintained in a radially outward position that engages the outer race to the bore surface of the power transmitting member to thereby rotationally engage the power transmitting member from the shaft.

2. The power transmitting device of claim 1, wherein the hub includes an inner sleeve portion fixed to the shaft, an outer sleeve portion radially offset relative to the inner sleeve portions, and a transverse web member that interconnects the inner and outer sleeve portions and delineates the annular cavity defined therebetween, wherein the actuator slot extends through the outer sleeve portion and the web member.

3. The power transmitting device of claim 2, wherein a plurality of lubrication apertures are formed through the inner and outer sleeve portions.

4. The power transmitting device of claim 1, wherein the transition portion tapers between the first and second portions.

5. The power transmitting device of claim 1, wherein the inner race includes a channel and a pair of channel walls, the wedging elements being received in the channel between the channel walls, the plurality of cam surfaces being formed on a radially outer surface of the channel.

6. The power transmitting device of claim 5, wherein the inner race further includes the first circumferentially extending lip member that is coupled to one of the channel walls and extends outwardly therefrom in a direction opposite the channel and wherein the first actuator notch is formed in the circumferentially extending lip member.

7. The power transmitting device of claim 6, wherein the first circumferentially extending lip member is radially offset from the channel.

8. The power transmitting device of claim 1, wherein the wedging elements are cylindrically shaped rollers.

9. The power transmitting device of claim 2, wherein the actuator member is integrally formed on a detent hub, the detent hub being axially movably mounted on the router sleeve portion of the hub, and wherein the actuator member moves axially with the detent hub within the actuator slot.

10. A power transmitting device comprising:
a first power transmitting member having a first bore;
a second power transmitting member having a second bore;
a shaft received in the first and second bores;
a first bearing set disposed between the first power transmitting member and the shaft;
a second bearing set disposed between the second power transmitting member and the shaft;
a hub fixed for rotation with the shaft, the hub having first and second annular cavities and an actuator slot extending between the first and second annular cavities;
a detent hub disposed between the first and second power transmitting members and mounted for sliding movement on the hub; and
an actuator member coupled to the detent hub and disposed for sliding movement within the first and second annular cavities and the actuator slot of the hub in response to movement of the detent hub on the hub;
wherein a portion of the first bearing set is disposed in the first annular cavity and a portion of the second bearing set is disposed in the second annular cavity, wherein each of the first and second bearing sets includes an inner race, an outer ace and a set of wedging elements, each inner race being coupled for rotation with the shaft and having a plurality of cam surfaces, each outer ace being configured as a split ring and disposed about an associated one of the inner races and received in an associated one of the first and second bores, each of the sets of wedging elements being received between a respective set of the inner and outer races, wherein the actuator member is axially positionable relative to the hub in a first position and a second position, wherein positioning of the actuator member in the first position permits relative rotation between the inner race and the outer race of the first bearing set and inhibits relative rotation between the inner race and the outer race of the second bearing set to thereby rotatably couple the shaft to the first power transmitting member and rotatably decouple the shaft and the second power transmitting member, and wherein positioning of the actuator member in a second position inhibits relative rotation between the inner race and the outer race of the first bearing set and permits relative rotation between the inner race and the outer race of the second bearing set to thereby rotatably decouple the shaft and the first power transmitting member and rotatably couple the shaft and the second power transmitting member.

11. The power transmitting device of claim 10, wherein the actuator member is positionable in a neutral position between the first and second positions, wherein positioning of the actuator member in the neutral position inhibits relative rotation between the inner race and the outer ace of the first and second bearing sets to thereby rotatably decouple the shaft from both the first and second power transmitting members.

12. The power transmitting device of claim 10, wherein the hub includes an inner sleeve portion fixed to the shaft, an outer sleeve portion upon which the detent hub is moveably disposed, and a web member that interconnects the inner and outer sleeve portions and delineates the first and second annular cavities, wherein the actuator slot extends through the outer sleeve portion and the web member and communicates with the first and second annular cavities.

13. The power transmitting device of claim 12, wherein each inner race includes a channel and a pair of channel walls, and wherein a respective set of the wedging elements is received in the channel between the channel walls, the plurality of cam surfaces being formed on a radially outer surface of the channel.

14. The power transmitting device of claim 13, wherein each inner race further includes a first circumferentially extending lip member that is coupled to one of the channel walls and extends outwardly therefrom in a direction opposite the channel so as to be disposed in an associated one of the first and second annular cavities, wherein a first actuator notch is formed in the first circumferentially extending lip member and wherein the actuator member is received in the first actuator notch.

15. The power transmitting device of claim 14, wherein each outer race includes a second circumferentially extending lip member disposed in an associated one of the first and second annular cavities, wherein a second actuator notch is formed in the second circumferentially extending lip member, and wherein the actuator member is received in the second actuator notch.

16. The power transmitting device of claim 15, wherein one of the first and second actuator notches includes a first portion having a first width and a second portion having a second width that is smaller than the first width.

17. The power transmitting device of claim 14, wherein the first circumferentially extending lip member is radially offset from the channel.

18. A power transmitting device comprising:
a shaft;
a power transmitting member having a bore, the bore having a bore surface that is disposed about the shaft;
an inner race coupled for rotation with the shaft, the inner race having a plurality of cam surfaces, the inner race defining a first actuator notch formed through a first lip member;
an outer race disposed about the inner race and received in the bore, the outer race being a circumferentially extending band having a pair of end segments that are spaced apart from one another to define a slit therebetween, the outer race having a race surface and defining a second actuator notch that is formed through a second lip member, the second actuator notch aligned with the first actuator notch and including a first portion, a transition portion and a second portion, the first portion being defined by a first width, the second portion being defined by a second width that is smaller than the first width, the transition portion coupling the first and second portions and tapering between the first portion and the second portion;
a plurality of wedging elements between the inner race and the outer race, each wedging element being disposed between an associated one of the cam surfaces and the race surface; and
an actuator having a hub and an actuator member, the hub being fixedly mounted on the shaft adjacent to the power transmitting member and defining an annular cavity and an actuator slot, the first and second lip members being disposed within the annular cavity and the actuator member being disposed within the actuator slot for aligning the actuator member for movement relative to the first and second actuator notches, the actuator member being selectively positionable in a first position and a second position, wherein positioning of the actuator member in the first position places the actuator member in the first actuator notch and the second portion of the second actuator notch to permit the wedging elements to be maintained in a radially inward position that disengages the outer race from the bore surface of the power transmitting member to thereby rotationally disengage the power transmitting member from the shaft, and wherein positioning of the actuator ember in the second position places the actuator member in the first actuator notch and the first portion of the second actuator notch to permit the wedging elements to be maintained in a radially outward position that engages the outer race to the bore surface of the power transmitting member to thereby rotationally engage the power transmitting member with the shaft;

wherein the hub includes an inner sleeve portion, an outer sleeve portion and a web member that interconnects the inner and outer sleeve portions and delineates the annular cavity, wherein a plurality of lubrication apertures are formed through the inner and outer sleeve portions, wherein the actuator slot extends through the outer sleeve portion and the web member of the hub, and wherein the actuator member is received in the actuator slot;

wherein the inner race includes a channel and a pair of channel walls, the wedging elements being received in the channel between the channel walls, the plurality of cam surfaces being formed on a radially outer surface of the channel, wherein the inner ace further includes the first circumferentially extending lip member that is coupled to one of the channel walls and extends outwardly therefrom in a direction opposite the channel into the annular cavity, wherein the first actuator notch is formed in the first circumferentially extending lip member, and wherein the first circumferentially extending lip member is radially offset from the channel;

wherein the second circumferentially extending lip member extends outwardly from the outer race into the annular cavity of the hub;

wherein the wedging elements are cylindrically shaped rollers; and wherein the actuator member is integrally formed on a detent hub, the detent hub being axially movably mounted on the outer sleeve portion of the hub.

* * * * *